UNITED STATES PATENT OFFICE.

FRITZ PROJAHN, OF DUISBURG, GERMANY.

METHOD OF MAKING ALKALIES AND ALUMINATES.

SPECIFICATION forming part of Letters Patent No. 684,864, dated October 22, 1901.

Application filed May 4, 1899. Serial No. 715,596. (No specimens.)

*To all whom it may concern:*

Be it known that I, FRITZ PROJAHN, chemist, a subject of the King of Prussia, German Emperor, and a resident of Duisburg, in the Province of the Rhine, in the Kingdom of Prussia, German Empire, have invented a new and useful Process for the Production of Caustic Alkalies and of Aluminates, of which the following is a specification.

Besides by the electrolytic decomposition of alkali chlorid caustic alkalies are at present produced from alkali carbonate, and also the aluminates are produced by the mediation of either alkali carbonate or caustic alkalies.

My new and improved process evades the soda process in that it allows of obtaining the above-mentioned substances directly from alkali sulfates.

The new process is based on the behavior of sulfates to pure metals in glow heat. The metal decomposes the sulfate, forming a sulfuret (sulfureted metal) and an oxid of metal. The base of the salt is separated in the form of an oxid.

In order to make my invention more clear, I will describe the new process as applied to sodium sulfate (as a representative of the sulfates) and iron, (as a representative of the metals.) The chemical process proceeds essentially in accordance with the formulæ following, viz:

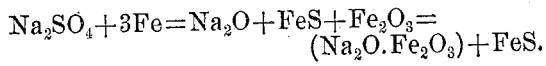

If aluminium oxid enters into the process, then arise aluminates according to the formula:

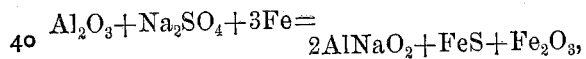

or to the formula:

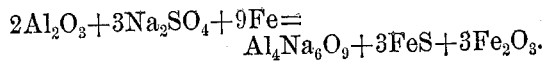

Of course the proportion of the raw materials is not bound to these formulæ, but may vary according to the condition of the raw materials as well as to the practical experiences made. If, for instance, caustic soda shall be produced, this is effected by glowing a mixture of sulfate of soda and pulverulent iron, and aluminate of soda is produced by similarly treating a mixture of sulfate of soda, bauxite, and pulverulent iron. After the reaction is finished and the mass cooled down it is lixiviated with water.

The advantages of the process reside in the simplicity of the operation and in the possibility of turning into account all the intermediate products. For instance, when employing iron as a reduction metal the lixiviated residue may be roasted, so that sulfuric acid or sulfurous acid is obtained, and the desulfurated residue of this phase may then be converted into metallic iron, preferably in spongy iron. Just so as iron, also such other metals may be used whose combination with sulfur is insoluble in water.

The new process will prove important for the treatment of bauxites, especially such containing much iron, the more as the residue of the molten aluminate is a good iron ore.

Having now described my invention, what I desire to secure by a patent of the United States is—

1. The process of producing caustic alkalies characterized by heating the respective sulfates with such pulverulent metals under exclusion of air whose combination with sulfur is insoluble in water.

2. The process for the production of aluminates characterized by heating alkali sulfate, aluminium oxid and a pulverulent metal, as set forth.

In witness whereof I have hereunto set my hand in presence of two witnesses.

FRITZ PROJAHN.

Witnesses:
   WILLIAM ESSENWEIN,
   GEO. P. PETTIT.